United States Patent [19]
Sugiyama

[11] 3,715,719
[45] Feb. 6, 1973

[54] TIRE PRESSURE INDICATION SYSTEM
[76] Inventor: Uichiro Sugiyama, 21-10, Zenpukuji 1-chome, Suginami-ku, Tokyo, Japan
[22] Filed: Feb. 10, 1971
[21] Appl. No.: 114,180

[30] Foreign Application Priority Data

| March 3, 1970 | Japan | 45/20261 |
| March 3, 1970 | Japan | 45/20262 |
| April 6, 1970 | Japan | 45/20263 |
| Nov. 4, 1970 | Japan | 45/108908 |

[52] U.S. Cl.................................340/58, 200/61.25
[51] Int. Cl............................................B60c 23/04
[58] Field of Search..........340/58; 200/61.25, 61.22; 116/34

[56] References Cited

UNITED STATES PATENTS

| 2,057,556 | 10/1936 | Cole | 340/58 |
| 3,521,230 | 7/1970 | Poole | 340/58 |
| 2,629,086 | 2/1953 | Ainsworth et al. | 340/58 |
| 3,430,196 | 2/1969 | Dalton | 340/58 |
| 3,508,193 | 4/1970 | Giovannelli et al. | 340/58 |

Primary Examiner—Alvin H. Waring
Attorney—John J. McGlew and Alfred E. Page

[57] ABSTRACT

An air pressure responsive electric switch is mounted on a rotatable tire and wheel assembly of a vehicle and is subjected to the tire internal pressure. A magnetically actuated switch is mounted on a non-rotatable component of the vehicle, such as a brake mounting plate. A magnet is mounted on the tire and wheel assembly for rotation in a plane adjacent the magnetically actuated switch and is caused to operate the latter switch when the pressure responsive switch is operated responsive to a predetermined decrease in the tire pressure. The magnet may be an electromagnet whose energization is controlled by the pressure responsive switch, or it may be a permanent magnet normally retracted from operative relation with the magnetically actuated switch and moved to an operative position by the pressure responsive switch upon a predetermined decrease in the tire pressure. The magnetically actuated switch controls the activation of an indicating unit including an audible and visual alarm positioned in the driver's compartment of the vehicle, and the control circuit for the indicating unit includes a thyristor, such as an SCR, whose gating is controlled by the magnetically actuated switch. The units mounted on the tire and wheel assembly and on the brake drum may be encased in an epoxy resin for protection against ambient conditions.

2 Claims, 17 Drawing Figures

INVENTOR
UICHIRO SUGIYAMA

BY McGlew + Tuttle
ATTORNEY

FIG. 17

TIRE PRESSURE INDICATION SYSTEM

BACKGROUND OF THE INVENTION

In recent years, particularly with the spread of express highways, public attention has been directed to the air pressure of tires of automobiles, and it is extremely evident that the danger of loss of tire pressure is universally admitted but, in view of the constitution of present tires, it is almost impossible to prevent a tire pressure reduction, except with some special tires. Accordingly, in view of the driving of automobiles as well as the prevention of accidents, it is necessary to endeavor to detect a tire pressure reduction and to always keep its air pressure at a proper value by any means.

Thereupon, there has hitherto been adopted a method in which a pressure detection unit, comprising a diaphragm type pressure switch, is mounted at a suitable position on a wheel, an electric signal is transmitted from the rotating tire to the vehicle body by a slide contact type arrangement or a wireless wave arrangement and a tire pressure reduction is indicated by a circuit including transistors in the driver's cab, or it is indicated by a rotating brush. However, since the pressure detection unit protrudes to the outside, soiling or damage due to mud or sand is caused, and transmission of the signal by the slide contact is hindered by bad contact due to abrasion, while wireless wave transmission is subjected to technical difficulties under the influence of noise, as well as having a high cost. Furthermore, the use of transistors in the electric circuit of an alarm indication decreases reliability, due to vibration of automobiles, variation of temperature, etc., while the use of a slip ring arrangement makes impossible a direct detection of a pressure decrease, even disregarding operating troubles. Thus, there is the risk that both the transistor type and the slip ring type are unreliable. Consequently, all these known means have disadvantages and, even if these means can theoretically be recognized, there is plenty of room to practically improve them. Particularly in the case of use of these means, there must be taken into consideration the points that the means used must be resistant to vibration, wind & rain, high & low temperatures, easily operated, free from trouble, high in reliability, and easily installed at a low cost.

SUMMARY OF THE INVENTION

This invention relates to a remote indication system for indicating a tire pressure of the type in which, when the pressure in the tires of an automobile decreases below the proper value, an alarm is activated in the operator's compartment.

More particularly, the present invention is directed to a remote tire pressure indication system in which the tire pressure is detected or sensed by a diaphragm type pressure switch of a tire pressure detection unit, and is converted into an electric signal with the signal being transmitted to the driver's compartment from the rotating tire and wheel assembly, by means of an electric signal transmission unit, so that the transmitted signal activates an alarm in an indication unit in the driver's compartment.

The present invention is designed to take into consideration the points mentioned above and to improve such tire pressure detection systems by eliminating the defects of known systems. In accordance with the invention, the tire pressure detection unit is mounted in a tire and wheel assembly, and a signal transmission unit, for transmitting a signal from the rotating tire to the vehicle body, comprises a magnetically actuated switch mounted on a fixed part of the vehicle, with thyristors, such as SCR's being included in an electric circuit connecting the signal transmission unit to the alarm indication unit.

According to the invention system, the tire pressure detection unit is not exposed to ambient conditions, so that there is no risk of damage due to mud, sand, etc. at all. The switch system is opened or closed by magnetic force of the signal transformation unit, with a magnet being provided to rotate with the tire and a magnetically actuated switch being provided on the vehicle body so that a responsive movement is made according to the approach between these two elements. There is no danger of abrasion, etc. at all, and a signal transmission takes place securely without being affected by vibration, etc. The magnet and lead switch are surrounded by plastic and epoxy resin and are never influenced by external conditions. Further, the thyristors are inserted in the electric circuit of the alarm indication unit and the alarm lamp or buzzer is securely controlled without contact and so that the present invention has great reliability and is economical, with resistance to vibration and temperature variations and a high response velocity.

For an understanding of the principles of the invention, reference is made to the following description of typical embodiments thereof as illustrated in the accompanying drawings.

DESCRIPTION OF THE PREFERRED EMBODIMENTS

Figure 1:
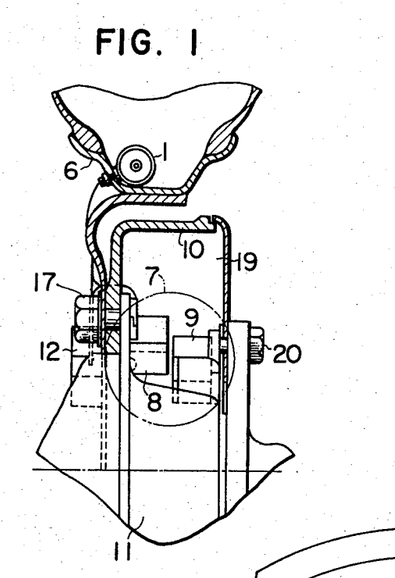
FIG. 1 is a broken section of the essential parts showing the constitution of a tire pressure detection unit and an electric signal transmission unit of the apparatus according to a first embodiment of the present invention, in one tire.
Figure 2:
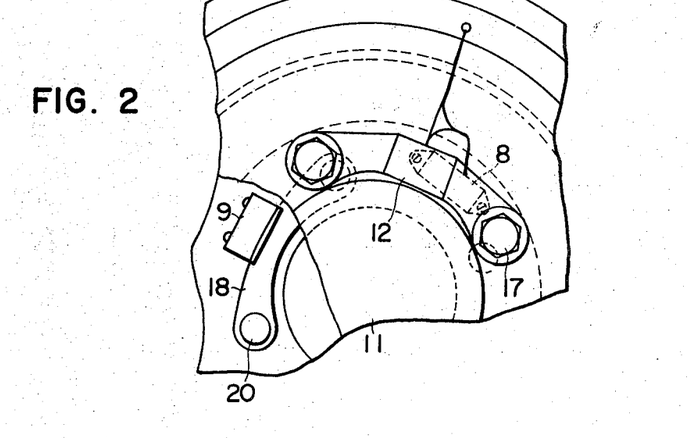
FIG. 2 is a broken side view of the essential parts thereof.
Figure 3:
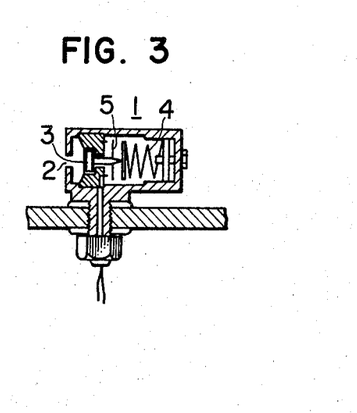
FIG. 3 is a section view of an embodiment of the tire pressure detection unit.

Referring to FIGS. 1 to 4, the description, in the case of one tire, is as follows:

A tire pressure detection unit 1, such as well known to those skilled in the art, is subjected to the air pressure within the tire through an inlet 2, the air pressure operating on a diaphragm 3 against an adjusting spring 4, and a contact 5 to open or close. Unit, 1 is arranged along the inner rim of a tire and secured thereto by a bolt. A signal transmission unit 7 is of the type in which a control is effected by a magnetic force between a magnet 8, a reed switch 9 and both of which are surrounded by plastic and epoxy resin with magnet 8 being secured at a suitable position on a wheel hub 11 by bolting to a brake drum 10. A mercury battery 14 is provided in the casing 13 of a battery unit 12, and the battery unit 12 is provided with a contact 16 which is opened or closed by a weight 15 due to the centrifugal force during the rotation of the tire. Unit 12 is mounted on brake drum 10, by means of a bolt 17, at a suitable position spaced from the axis of the wheel. The three members of said pressure detection, including unit 1, contacts 5, 16 of the battery unit 12 and the magnet 8, rotatable with the rotating tire, are connected in series, thereby exciting the magnet 8 at the time of pressure reduction in case the contact 16 is closed responsive to rotation of the tire. Reed switch 9 of said signal transmission unit 7 is adjustably bolted to the fitting member 18 which is secured by bolts 20 to a backplate 19, at a suitable position corresponding to the locus of rotation of magnet 8, and to maintain a gap of about 2 mm between magnet 8 and switch 9.

Figure 4:
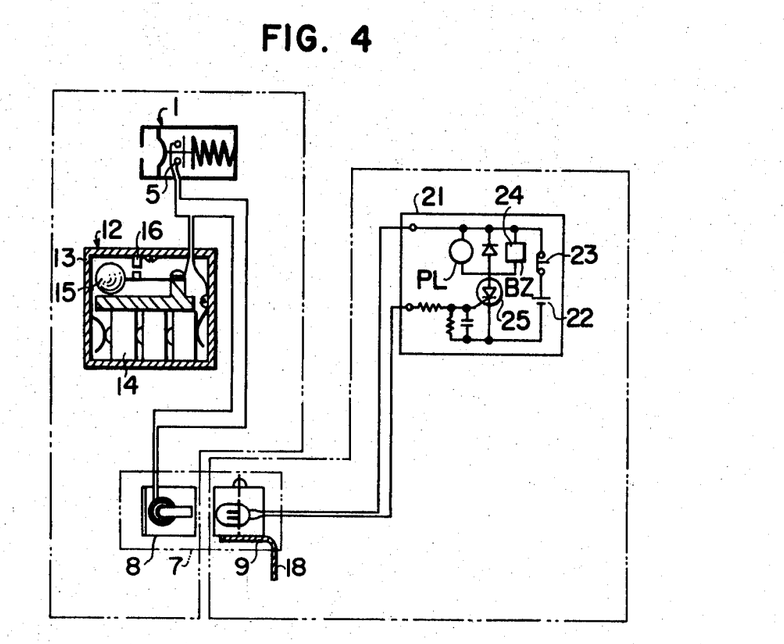
FIG. 4 is a schematic wiring diagram of the essential parts of FIGS. 1 and 2 whose sections are indicated in detail.

Referring to FIG. 4, the alarm indication unit 21, which is located in the driver's compartment, includes a source of potential 22, a normally closed push bottom switch 23, a buzzer 24, a thyristor (SCR) 25 and an indicating lamp PL. Potential source 22 is connected to the cathode of SCR 25 and also, through push button switch 23, to first terminals of buzzer 24 of BZ and lamp PL. The other terminals of the buzzer and the lamp are connected to the anode of SCR 25.

It will be noted that buzzer 24 and lamp PL are connected in parallel with each other and in parallel with a diode connected to the anode of SCR 25. The gate circuit of SCR 25 includes a gating resistor and a gating condenser, connected between the cathode and gate of SCR 25, for improving the dv/dt ratio of the thyristor or SCR.

The opposite terminals of reed switch 9 are connected, respectively, to the gate of SCR 25 and to the first terminal of lamp PL. Thus, when magnet 8 mounted to rotate with the tire is energized and reed switch 9 is thus closed, a gating current is supplied to thyristor or SCR 25 which becomes conductive to close a series parallel circuit including the potential source, switch 23, buzzer 24 and lamp PL. Energization of the buzzer warns the driver or operator of a loss of air pressure in a tire. As magnet 8 rotates with the tire, it closes reed switch 9 once during each revolution, so that reed switch 9 is only closed intermittently. However, once thyristor or SCR 25 is triggered conductive by application of a gating current thereto, it remains conductive so that buzzer 24 is continuously energized. After the driver or operator has noted, from the sounding of the buzzer or the lighting of lamp PL that there is a loss of pressure in a tire, he can deactivate the indicator by opening normally closed push button switch 23.

Figure 5:
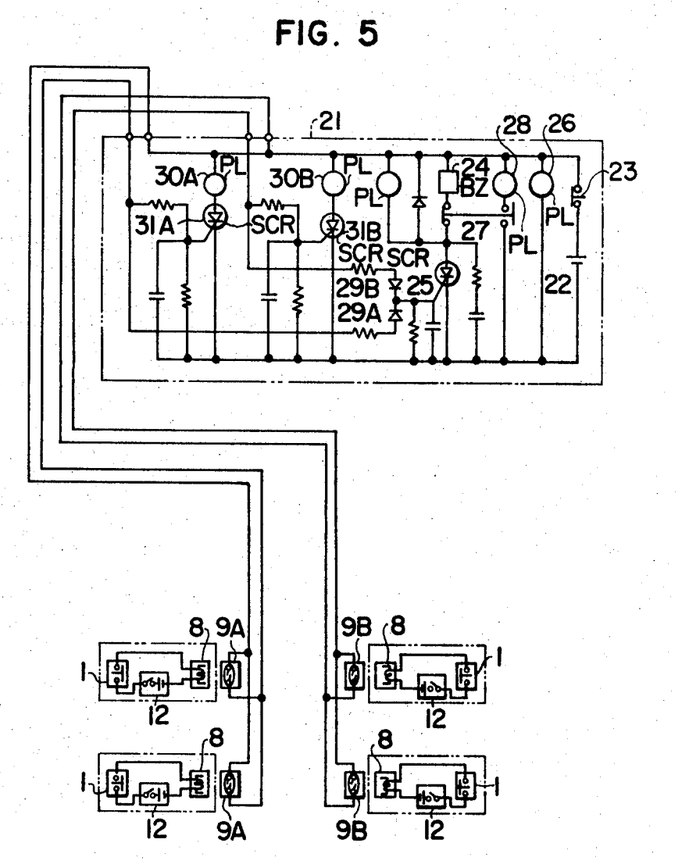
FIG. 5 is a schematic wiring diagram of the entire in a four wheel car.

Next, an alarm indication in case of a four-wheel car will be described with reference to FIG. 5. With plurality of such tires in general, various indication arrangements can be considered but, in view of the case where an automobile is moved aside for the repair of the pressure reduced tire, respective are provided for the tires on the right and for the pair of tires on the left respectively. For this purpose, pressure detection units and signal transmission units 7 are mounted on all the tires of the four-wheel car and in the electric circuit of an alarm indication unit 21', an electric potential pilot lamp 26 and a lamp 28 energizable interchangeably with buzzer 24 by means of a change over switch 27, are connected in circuit with source 22 and normally sides push button switch 25.

The gating electrode of thyristor 25 is connected to the pressure reduction detecting means for the left and right side tires through respective diodes 29A and 29B, and respective pilot lamps 30A and 30B with associated respective thyristors 31A and 31B are also provided for the left side tires and the right side tires. The two reed switches 9A and 9B for the two tires on each respective side of the vehicle are connected in parallel with each other to alarm indication unit 21' so that when either the front or the rear tire on either side of the vehicle has a pressure reduction, the associated lamp 30A or 30B is lit while buzzer 24 is energized to warn the vehicle operator of a loss of pressure in a tire on one or the other sides of the vehicle. Instead of a warning being given by buzzer 24, a warning may be provided by lamp 28, selectively as desired, through operation of the change-over switch 27.

Figures 6, 9:
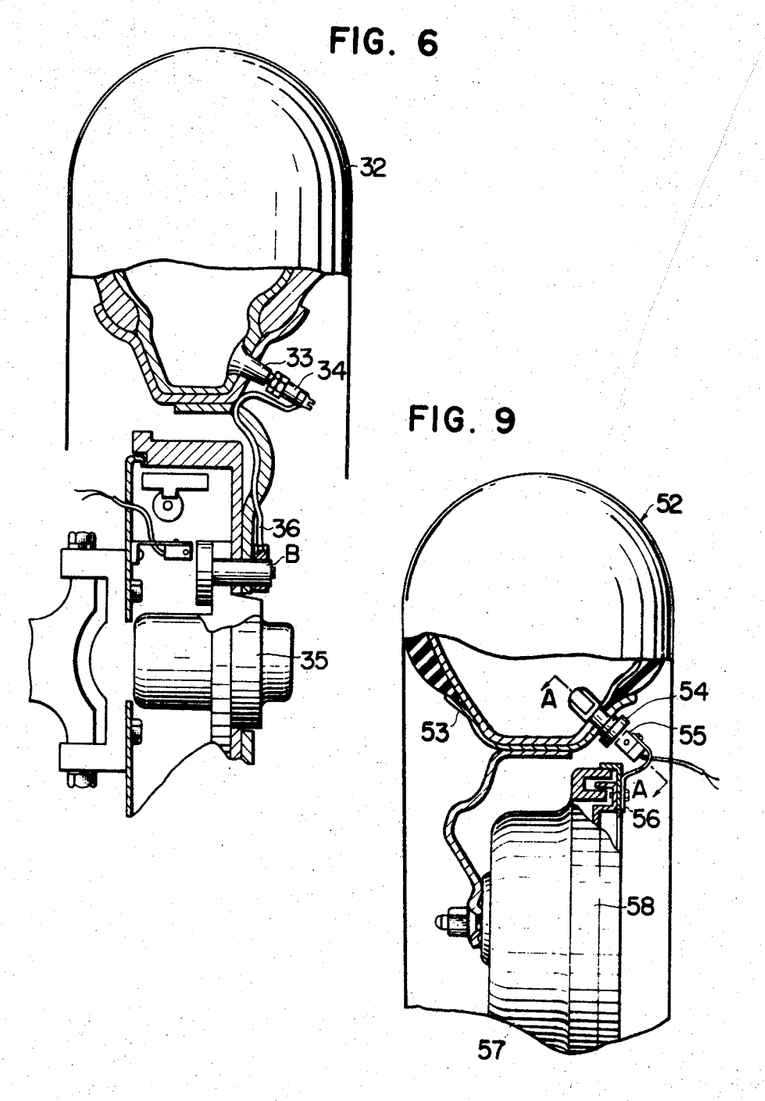
FIG. 6 is a partially broken away sectional view illustrating the essential parts of a second embodiment of the invention.
FIG. 9 is a broken away sectional view illustrating a third embodiment of the invention.

In FIG. 6, a tire pressure sensing element 34 is fitted to a tire valve 33 mounted on a tire 32, and element 34 is connected to a pressure detection mechanism part (B), mounted on a wheel hub 35, by means of a conduit 36.

Figure 7:
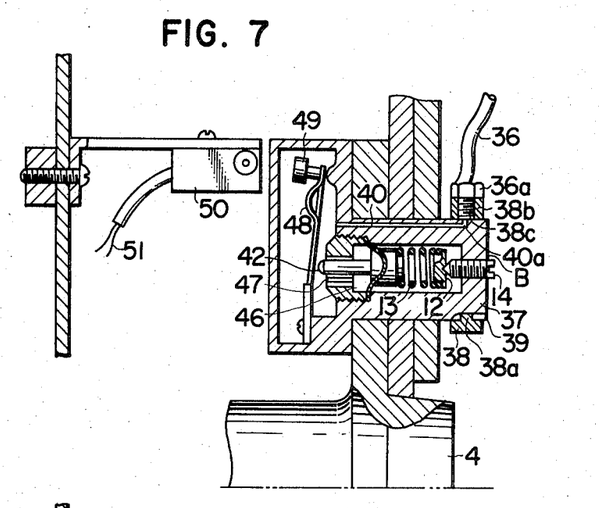
FIGS. 7 and 8 are sectional views, corresponding to FIG. 6, illustrating the inoperative and operative conditions of the pressure detection mechanism, respectively.
Figure 8:
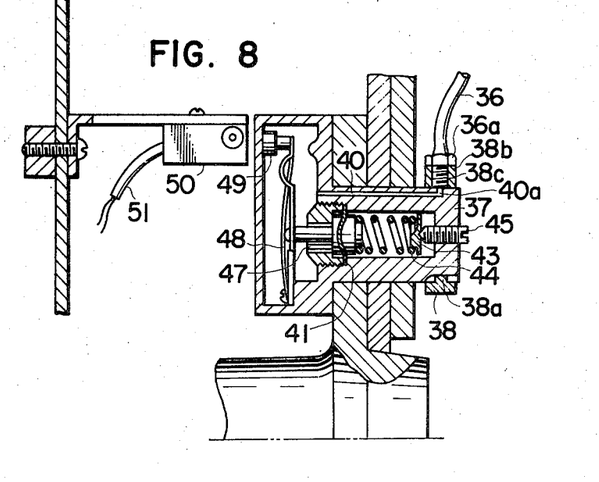

FIGS. 7 and 8 show the construction of the pressure detection mechanism part (B). At the connection between conduit 36 and a pressure detection unit 37, a threaded end 36a of conduit 36 is secured in a threaded aperture 38b of an annular element 38 having an inwardly projecting part or rib 38a, and the connection part is kept airtight with the pressure detection unit 37 by means of an 0 ring 38c, The rib 38a provided of the annular element 38 is adapted to be fitted in a groove 39 provided in the pressure detection unit 37, and the groove 39 and rib 38a are so designed that a port 40a of a passage 40 in pressure detection unit 37 coincides with the passage through conduit 36.

A push element 42, moving together with a diaphragm 41 responding to a tire internal pressure, is mounted on the pressure detection unit 37, and diaphragm 41 is engaged by a spring 44 seated, at one end, against an enlarged spring seat on the diaphragm and, at the other end, on a spring seat 43. Spring seat 43 has its outer surface formed with a conical recess engaged by a conical point on an adjusting screw 45. Even if spring seat 43 and spring 44 move, responsive to vibration due to external pressure, or inclined, due to rotation at the time of adjustment, smooth movement thereof is possible without exerting an influence upon the movement of diaphragm 41 and push element 42.

Hence, in pressure detection unit 37, when the tire internal pressure decreases, the air in an air chamber 46 flows out through passage 47. With the reduction in pressure in chamber 46, diaphragm 41 is moved to the left by spring 44 so that the parts of the detection unit move from the position shown in FIG. 7 to the position shown in FIG. 8, in which element 42, moving to the left, has pushed a pressure switch device 48 to the left. A permanent magnet 49 is fitted to the extreme end of the pressure switch device 48, so that the permanent magnet 49 approaches a reed switch 50 by the movement of device 48. Reed switch 50 closes, and thus an alarm device unit (not shown in the drawing) is actuated through a conductors 51.

By this alarm, a pressure reduction in the tire is signalled and when the tire is re-inflated, the air flows into air chamber 46 through passages 40 and 47. When a tire internal pressure becomes a suitable value, the diaphragm 41 is deformed in the right direction against the spring 44, whereby the push element 42 also moves in the right direction, the pressure switch device 48 deflects to the right, and reed switch 50 is opened to deactivate the alarm unit.

As mentioned above, in this embodiment even a slight reduction in the tire internal pressure can be detected and a device for converting the tire internal pressure into a suitable signal is provided, whereby a regular pressure can always be maintained. Accordingly, provision of the apparatus of the present invention makes a contribution to the prevention of traffic accidents and serves advantageously for the control of vehicles, the preservation of tires, etc.

In FIG. 9 illustrating the third embodiment, reference numeral 52 indicates a tire body, and a pressure switch 54 is fitted in a rim 53 to sense the tire internal pressure. A reed switch 55 is secured to a back plate 58 of a brake drum 57, through a bracket 56, at a position adjacent the plane of rotation pressure switch 54. As best seen in the enlarged views of FIGS. 10 and 11, pressure switch 54 includes a cylindrical body 60 threaded into to a tire internal pressure detection body 59 spring 61 is arranged in said body 60, and an adjusting screw 64 has its inner end secured to a diaphragm 65 and its outer end threaded to receive a nut 63 for adjusting a spring seat 62. A reset pin 66 is secured to the driving side of diaphragm 65 for reciprocation responsive to flexure of the diaphragm. A fitting body 67 is located on the external surface of the tire and is threaded into body 59. An operating shaft 68 is reciprocable in body 67, in a direction perpendicular to the direction of reciprocation of reset pin 66, and a groove or notch 69 is formed in shaft 68 for engagement with an end of reset pin 66.

Figure 10:
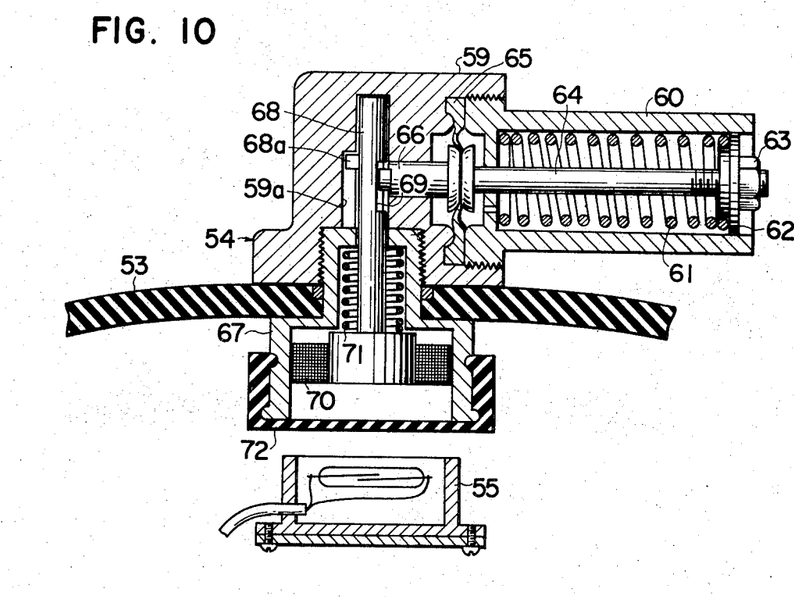
FIGS. 10 and 11 are enlarged sections taken along the line A—A of FIG. 9, with FIG. 10 illustrating the inoperative position of the pressure responsive means and FIG. 11 illustrating the operative position thereof.
Figure 11:
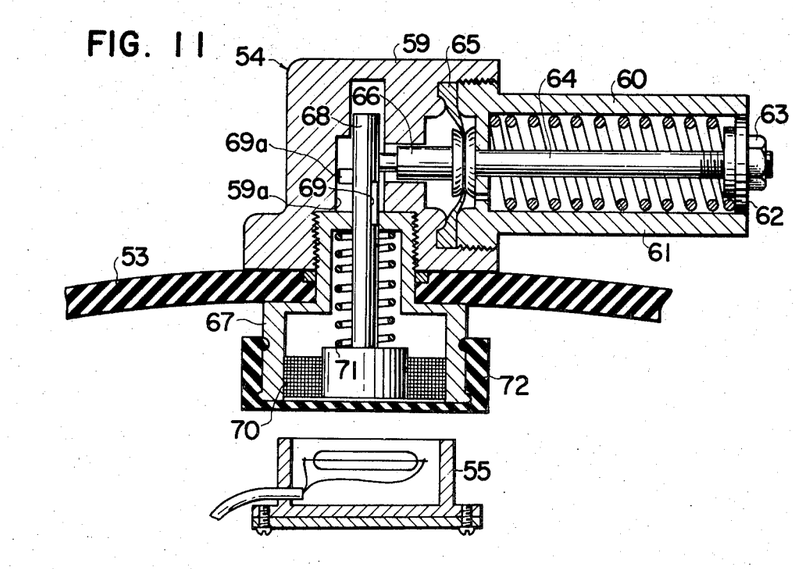

A permanent magnet 70 is mounted on the opposite end of operating shaft 68, and a spring 71, seated in body 67 and engaging an enlarged end of shaft 68, biases shaft 68 outwardly.

Figure 12:
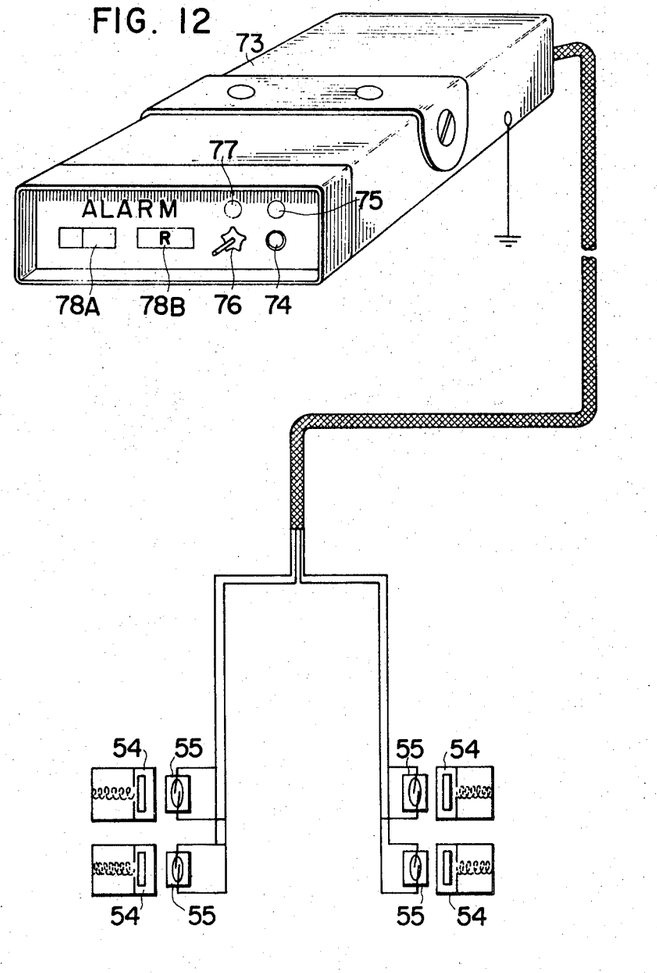
FIG. 12 is a part schematic and part perspective view of the apparatus of the present invention.

A rubber cap 72 encloses the outer end of body 67, to prevent disengagement of shaft 68 and magnet 70. Shaft 68 is formed with a projection or rib 68a which engages in a longitudinal groove 69a in body 59 to prevent rotation of permanent magnet 70. Reed switch 55 is suitably mounted at a position adjacent the plane of rotation of magnet 70. alarm indication The tire pressure sensing part which is constituted as mentioned above, and which senses a tire internal pressure, is connected to an alarm indication mechanism 73, for instance, shown in FIG. 12. A respective sensing part may be provided for each of the two tires on the left side of a four-wheel car and each of the two tires on the right side of the car, for example such as shown in FIG. 5. Referring to FIG. 12, there are included, in the electric circuit of alarm indication mechanism 73, a switch 74, a potential source pilot lamp 75, and a lamp 77, replacing a buzzer (not shown in the drawing) by means of a changing over switch 76. Also left and right pilot lamps 78A, 78B are provided and, when either of the front and rear tires on one side decreases in pressure, the pilot lamp in the alarm indication mechanism 73 is lighted (for instance, when the tire on the left side decreases in pressure, the pilot lamp 78A is lighted) and at the same time the buzzer sounds or the lamp 77, instead of the buzzer, is lighted and thus a tire pressure reduction is signalled. In the above alarm indication arrangement, the respective pairs of front and rear tires on the right and left sides are mentioned, but the other indication arrangements may be used.

Accordingly, since the apparatus of this embodiment is quite easily mounted as compared with the conventional tire pressure indication apparatus and since the indication part is fitted in the inside of the tire, a tire internal pressure can be accurately sensed and at the same time there is an advantage that the apparatus of this embodiment can easily be exchanged like the conventional tire exchange.

Figures 13, 14, 15:
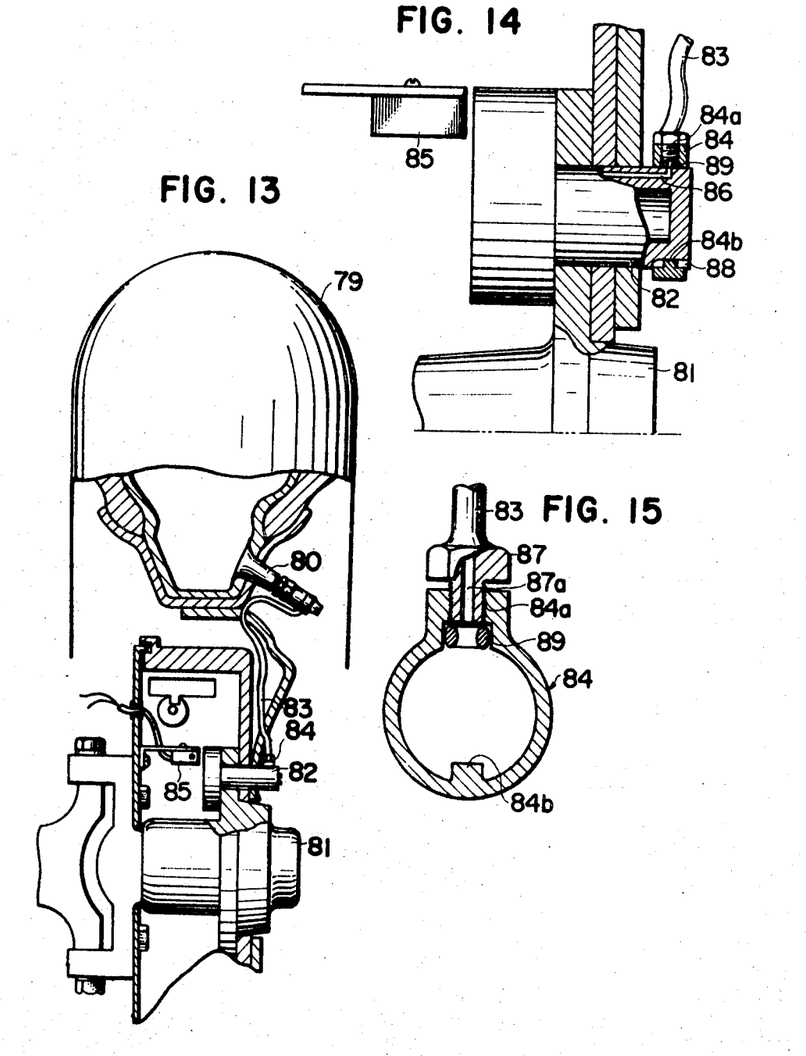
FIG. 13 is a broken sectional view illustrating a further embodiment of the invention.
FIG. 14 is an enlarged view, partly in section, of an essential component of FIG. 13.
FIG. 15 is a sectional view through a connection element illustrated in FIG. 14.

Of the modifications shown in FIGS. 13, 14 and 15, FIG. 13 illustrates a tire valve 80 mounted in a tire 79 and a pressure sensing unit 82 mounted on a wheel hub 81. Valve 80 and unit 82 are interconnected by a conduit 83 secured, through a connection 84, and a change in the internal pressure of the tire is sensed by a switch unit 85.

Referring to FIGS. 14 and 15, a passage 86 is provided in such a manner that said conduit 83 communicates with the detection unit 82, and the internal mechanism of the detection unit 82 is actuated by the air flowing in conduit 83 and passage 86 whereby the tire internal pressure is sensed.

Connection element 84 is formed with a threaded aperture 84a, at its upper part, and with a projection or rib 84b at its lower part. Aperture 84a threadedly receives a threaded bolt 87 secured to conduit 83 and formed with a bore or passage 87a. Rib 84b fits into a groove 88 in detection unit 82, so located that passage 86 communicates with conduit 83 when rib 84b is seated in groove 88. Airtight connection between unit 82 and conduit 83 is effected through an 0 ring 89 compressed by bolt 87. The described parts make possible accurate sensing of the internal pressure of the tire.

Figure 16:
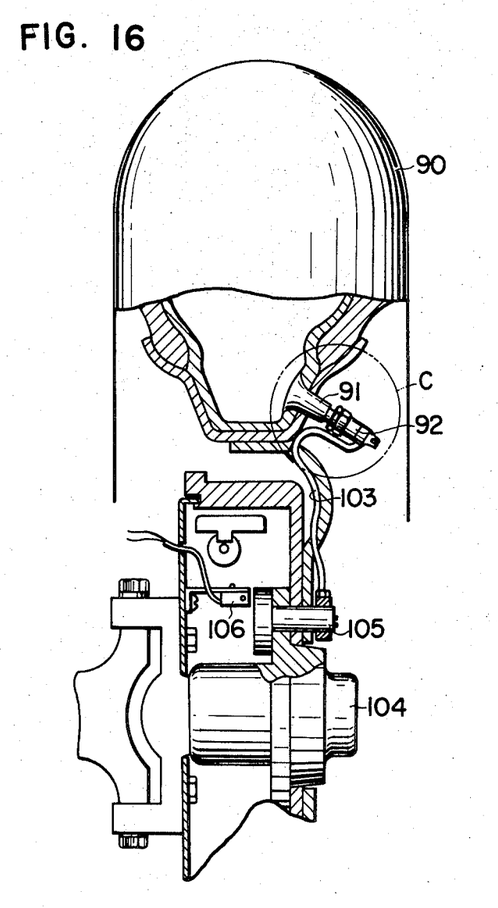
FIG. 16 is a broken sectional view of yet another embodiment of the invention.
Figure 17:
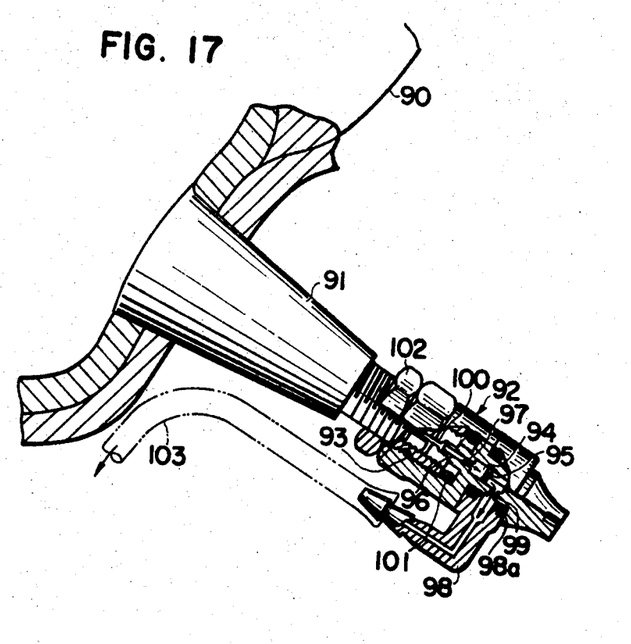
FIG. 17 is a sectional view, partly in elevation, of that portion of FIG. 16 enclosed by the circle C.

In the further modification shown in FIGS. 16 and 17, a tire internal pressure sensing element 92 is fitted to a tire valve 91 provided on a tire 90 and connected to a tire internal pressure sensing unit 105 provided on a wheel hub 104, through a conduit 103, and the tire internal pressure is sensed through a switch unit 106.

As shown in FIG. 17, element 92 is cap-shaped and has a threaded inner end for connection to tire valve 91. A central projection 96 in element 98 is formed with a bore 97 communicating with the chamber 94 receiving a filter 95. A cap 98, connecting with the conduit 103, is airtightly fitted to the outer part of element 92 through a packing 98a, Chamber 94 communicates with the cap 98 through a small aperture 99.

Hence, when element 92 is threaded onto tire valve 91, the projection 96 pushes a pin 100 provided in the tire valve 91 and, by the action of pin 100, a valve (not shown in the drawing) is opened, the air in the tire flows in the direction of the arrow and then flows to the detection unit 105 through the conduit 103. Detection or sensing unit 105 is actuated by the change in the tire internal pressure, and any change of the tire internal pressure is sensed through the switch unit 106.

Accordingly, since element 92 must be air-tightly mounted, the tire valve 91 and element 92 are kept airtight with a packing 101 and the cap 98 is airtightly secured to said element 92 through the packing 98a. An auxiliary or locking nut 102 fixes element 92 on tire valve 91, to prevent disengagement of element 92 from valve 91 during rotation of the tire. If any of the parts, except the tire, is damaged, the very small diameter passageways in the parts prevent sudden decreases in the tire internal pressure. The filter 95 prevents clogging of the small diameter passages due to airborne dust or the like in the tire.

While specific embodiments of the invention have been shown and described in detail to illustrate the application of the principles of the invention, it will be understood that the invention may be embodied otherwise without departing from such principles.

What is claimed is:

1. A system for detecting and indicating change of pressure in a pneumatic tire, forming part of a rotatable tire and wheel assembly mounted on a vehicle, comprising, in combination, an air pressure responsive switch device mounted on the rotatable tire and wheel assembly and subjected to the tire internal pressure; a magnetically actuated switch mounted on a non-rotatable component of the vehicle; magnet means mounted on the tire and wheel assembly for rotation in a plane of said assembly adjacent said magnetically actuated switch, and controlled, as to operative relation with said magnetically actuated switch, by said pressure responsive switch device; said pressure responsive switch device, upon a predetermined change in the tire pressure, conditioning said magnet means to operate said magnetically actuated switch cyclically during rotation of said tire and wheel assembly; a tire pressure change indicator unit observable by the vehicle operator; circuit means connecting said indicator unit to said magnetically actuated switch for activation of said indicator unit responsive to operation of said magnetically actuated switch by said magnet means; said pressure responsive switch device including a movable diaphragm subjected to the pressure in the tire; a spring engaged with said diaphragm and resisting movement of said diaphragm responsive to the pressure in the tire; a reset pin connected to said diaphragm for reciprocation responsive to movement of said diaphragm; and operating shaft mounted to reciprocate perpendicularly to the direction of reciprocation of said reset pin; said magnet means comprising a permanent magnet mounted on one end of said operating shaft; said operating shaft being formed with a longitudinally extending groove having the outer end of said reset pin engaged therein; spring means biasing said operating shaft to move in the direction of said permanent magnet to position said permanent magnet in operative relation with said magnetically actuated switch; said magnetically actuated switch comprising a reed switch operable by said permanent magnet; said reset pin being retracted from said groove, responsive to a change in the tire pressure, to provide for said spring means to move said operating shaft and said permanent magnet to a position in which said permanent magnet is in operative relation with said reed switch.

2. A system for detecting and indicating change of pressure in a pneumatic tire, forming part of a rotatable tire and wheel assembly mounted on a vehicle, comprising, in combination, an air pressure responsive switch device mounted on the rotatable tire and wheel assembly and subjected to the tire internal pressure; and magnetically actuated switch mounted on a non-rotatable component of the vehicle; magnet means mounted on the tire and wheel assembly for rotation in a plane of said assembly adjacent said magnetically actuated switch, and controlled, as to operative relation with said magnetically actuated switch, by said pressure responsive switch device; said pressure responsive switch device, upon a predetermined change in the tire pressure, conditioning said magnet means to operate said magnetically actuated switch cyclically during rotation of said tire and wheel assembly ; a tire pressure change indicator unit observable by the vehicle operator; circuit means connecting said indicator unit to said magnetically actuated switch for activation of said indicator unit responsive to operation of said magnetically actuated switch by said magnet means; said pressure responsive switch device including a movable diaphragm subjected to the pressure in the tire; a spring engaged with said diaphragm and resisting movement of said diaphragm responsive to the pressure in the tire; a conduit having one end communicating with the interior of the pneumatic tire; said pressure responsive switch device comprising an annular body in which said movable diaphragm is mounted and enclosing the spring engaging said diaphragm; said annular body including an air chamber communicating with that surface of said diaphragm opposite the surface engaged by said spring; said annular body having a small diameter passage extending longitudinally thereof and communicating at one end with said air chamber; a radial port adjacent the outer end of said annular body communicating with the other end of said small diameter passage; and an annular conduit connection element embracing the outer end of said annular body, and formed with a threaded radial aperture therethrough arranged to be threadedly engaged by a tubular bolt connecting said conduit to said connection member; said annular connection element having a projection on its inner circumferential surface engageable with a longitudinally extending groove in the outer end of said annular body; said groove being so located that, when said projection is engaged therein, the threaded aperture in the annular connection element communicates with said radial port.

* * * * *